US 9,392,749 B2

(12) United States Patent
Takahashi et al.

(10) Patent No.: US 9,392,749 B2
(45) Date of Patent: Jul. 19, 2016

(54) POWER TOOL WITH VIBRATION DAMPENING (75) Inventors: Yuji Takahashi, Anjo (JP); Sadaharu Oki, Anjo (JP); Tadayoshi Tsuchiya, Anjo (JP); Takahiro Kamiya, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 1267 days.

(21) Appl. No.: 12/578,065

(22) Filed: Oct. 13, 2009

(65) Prior Publication Data
US 2010/0095533 A1 Apr. 22, 2010

(30) Foreign Application Priority Data

Oct. 17, 2008 (JP) ................................. 2008-268456
Oct. 17, 2008 (JP) ................................. 2008-268457
May 14, 2009 (JP) ................................. 2009-117878

(51) Int. Cl.
*A01G 3/053* (2006.01)
*B25F 5/02* (2006.01)
(Continued)

(52) U.S. Cl.
CPC .............. *A01G 3/053* (2013.01); *A01G 3/0475* (2013.01); *B25F 5/006* (2013.01); *B25F 5/02* (2013.01);
(Continued)

(58) Field of Classification Search
CPC ....... A01G 3/04; A01G 3/047; A01G 3/0475; A01G 3/053; A01G 2003/0461; A01G 3/085; A01G 3/086; A01G 3/088; B25D 17/043; B25D 17/24; B25F 5/006; B25F 5/02; B25B 15/00; B27B 17/0033; F16F 1/3732; F16F 1/3735; F16F 15/02; F16F 15/08

USPC ............... 30/228, 44–46, 180, 187, 206, 209, 30/210, 216, 227, 245, 247, 264, 272.1, 30/277.4, 392–394, 208, 215, 217–220; 173/162.1, 162.2; 123/192.1
IPC ... A01G 3/04,3/047, 3/0475, 3/053, 2003/0461; B25D 17/043, 17/24; B25F 5/006, 5/02; B26B 15/00
See application file for complete search history.

(56) References Cited

U.S. PATENT DOCUMENTS 3,144,571 A * 8/1964 Kukulski ......................... 310/29
3,728,793 A * 4/1973 Makinson et al. .............. 30/383
(Continued)

FOREIGN PATENT DOCUMENTS

CN    1468692 A    1/2004
CN    1709026 A    12/2005
(Continued)

OTHER PUBLICATIONS

Extended European Search Report for EP 09012026.2 dated Mar. 11, 2010.
(Continued)

*Primary Examiner* — Clark F Dexter
(74) *Attorney, Agent, or Firm* — J-TEK LAW PLLC; Jeffrey D. Tekanic; Scott T. Wakeman (57) ABSTRACT

A power tool includes an inner housing (50) at least partially housed within and spaced from an outer housing (30). The inner housing supports a tool (102, 302), such as a pair of shear blades, and houses a motor (80) that drives the tool. The outer housing includes a grip (14, 18) to be grasped by a user. At least one vibration insulator (71-75) can be disposed between the inner housing and the outer housing and in a manner such that the vibration insulator(s) is(are) protected by the outer housing. An intake opening (60a, 60b) and exhaust opening (64a, 64b) can be formed in the inner housing and can be shielded by respective portions of an inner surface of the outer housing.

13 Claims, 9 Drawing Sheets (51) Int. Cl.
  *B26B 15/00* (2006.01)
  *A01G 3/047* (2006.01)
  *B25F 5/00* (2006.01)
  *F16F 1/373* (2006.01)
  *F16F 15/02* (2006.01)
  *F16F 15/08* (2006.01)
  *A01G 3/04* (2006.01)

(52) U.S. Cl.
  CPC .............. *B26B 15/00* (2013.01); *F16F 1/3732* (2013.01); *F16F 15/02* (2013.01); *F16F 15/08* (2013.01); *A01G 2003/0461* (2013.01)

(56) References Cited

U.S. PATENT DOCUMENTS

| | | | | |
|---|---|---|---|---|
| 3,849,883 | A * | 11/1974 | Kolorz | 30/381 |
| 4,135,301 | A * | 1/1979 | Hoeppner | 30/381 |
| 4,202,096 | A * | 5/1980 | Nagashima | 30/381 |
| 4,285,309 | A * | 8/1981 | Johansson | 123/195 C |
| 4,638,562 | A | 1/1987 | Drake | |
| 4,667,749 | A * | 5/1987 | Keller | 173/162.2 |
| 4,670,985 | A * | 6/1987 | Biersteker | 30/381 |
| 5,531,027 | A | 7/1996 | Martinez et al. | |
| 5,692,306 | A | 12/1997 | Stoll et al. | |
| 6,144,121 | A | 11/2000 | Ishida et al. | |
| 6,643,939 | B2 * | 11/2003 | Tajima et al. | 30/381 |
| 6,799,373 | B2 * | 10/2004 | Menzel et al. | 30/381 |
| 6,994,068 | B2 * | 2/2006 | Menzel et al. | 123/192.1 |
| 7,941,930 | B2 * | 5/2011 | Guip | 30/523 |
| 8,225,514 | B2 * | 7/2012 | Guip et al. | 30/381 |
| 8,672,305 | B2 * | 3/2014 | Wolf et al. | 267/141.2 |
| 2002/0108251 | A1 * | 8/2002 | Brum et al. | 30/43.7 |
| 2004/0035009 | A1 | 2/2004 | Richards | |
| 2005/0279518 | A1 | 12/2005 | Kawamoto et al. | |
| 2008/0276469 | A1 * | 11/2008 | Guip et al. | 30/383 |
| 2010/0071925 | A1 * | 3/2010 | Guip | 173/162.2 |

FOREIGN PATENT DOCUMENTS

| | | | |
|---|---|---|---|
| CN | 201107932 | | 9/2008 |
| EP | 0 167 760 | * 1/1986 | .............. 30/45 |
| EP | 1 733 612 B1 | | 4/2008 |
| GB | 2440646 A | | 2/2008 |
| JP | S61-89015 A | | 6/1986 |
| JP | H11-10558 A | | 1/1999 |
| JP | 2003199431 A | | 7/2003 |
| JP | 2004-066439 | | 3/2004 |
| JP | 2006042724 A | | 2/2006 |
| JP | 2007075917 A | | 3/2007 |

OTHER PUBLICATIONS

Office Action dated Feb. 29, 2012 from Chinese Patent Office for corresponding Chinese application No. CN200910206103.2.
Communication dated May 31, 2011 from the EPO in counterpart EP application No. 09 012 026.2-2313, including rejections made by EPO Examiner, examined claims and arguments submitted by the Applicant's EP representative.
Office Action mailed Sep. 10, 2013 from Japanese Patent Office for counterpart Japanese application No. 2012-064041.
Communication from European Patent Office dated Nov. 29, 2012 for related EP Application No. 12169556.3.
Office Action from Chinese Patent Office dated Mar. 27, 2013 for counterpart Chinese patent application No. 2009102061031, including English translation.
Extended European Search Report dated Aug. 28, 2012 for related EP Application No. 12169556.3, including original claims 1-15 from parent application EP 09012026.2.
Decision of Rejection mailed Apr. 30, 2014 in counterpart JP application No. 2012-180200, including English translation thereof.
Office Action mailed Feb. 4, 2014 from Japanese Patent Office in counterpart Japanese patent application No. 2012-180200, including English translation of substantive portions thereof.
Office Action from Chinese Patent Office in counterpart Chinese patent application No. 2013111801171110, including English translation thereof.

* cited by examiner

POWER TOOL WITH VIBRATION DAMPENING

CROSS-REFERENCE TO RELATED APPLICATIONS

This application claims priority to (1) Japanese Patent Application No. 2008-268456 filed on Oct. 17, 2008, (2) Japanese Patent Application No. 2008-268457 filed on Oct. 17, 2008, and (3) Japanese Patent Application No. 2009-117878 filed on May 14, 2009, the contents of which are hereby incorporated by reference into the present application.

TECHNICAL FIELD

The present invention relates to power tools, including but not limited to a gardening trimmer or shears, a hedge trimmer and a grass trimmer.

DESCRIPTION OF RELATED ART

A hedge trimmer is one type of gardening trimmer that is disclosed in Japanese Patent Application Publication No. 2006-42724A. This hedge trimmer comprises a pair of shear blades, an engine as a prime mover that drives the pair of shear blades, a crank mechanism that converts the rotational motion of the prime mover into reciprocal motion of the pair of shear blades, and a frame that supports the prime mover and crank mechanism. A grip to be grasped by a user is arranged on the frame.

In this hedge trimmer, a vibration insulating spring and an elastic support member are provided between the crank mechanism and the frame for dampening or absorbing vibration generated thereby.

Another hedge trimmer is disclosed in Japanese Patent Application Publication No. 2007-75917A. This hedge trimmer comprises a pair of shear blades, a motor as a prime mover that drives the pair of shear blades, a crank mechanism that converts the rotational motion of the prime mover into reciprocal motion of the pair of shear blades, and a housing that houses the motor and crank mechanism. The pair of shear blades is attached to the housing. An intake opening and an exhaust opening for cooling the motor are formed in the housing.

With this type of hedge trimmer, if a foreign object such as a pebble or the like were to enter into the interior thereof from the intake opening and the exhaust opening, the foreign object may cause damage to the internal components. Accordingly, a mesh filter is arranged on the intake opening of this hedge trimmer in order to prevent foreign objects from entering through the intake opening into the interior of the hedge trimmer.

SUMMARY

Known hedge trimmers have been constructed such that a vibration insulator or a vibration dampening/absorbing device (hereinafter "vibration insulator"), such as the above-described vibration insulating/dampening spring and/or the elastic support member, is externally exposed. Consequently, deterioration of and damage to the vibration insulator is inevitable. After a certain amount of deterioration of and damage to the vibration insulator has occurred, vibration can no longer be prevented from being transmitted to the user. In addition, if the deterioration of and damage to the vibration insulator further proceeds to a significant degree, undesirable rattling may occur, and the amount of vibration transmitted to the user may increase substantially. Furthermore, in known hedge trimmers having a mesh filter arranged on the intake opening, the cross-sectional area of the intake opening will be reduced, which may diminish the cooling capacity. Moreover, when the mesh filter is arranged on the intake opening, loud aspiration noises may be generated, and the overall operating noise of the hedge trimmer may increase.

It is an object of the present teachings to disclose power tools having one or more of improved vibration-reduction properties, improved internal space utilization and reduced operating noise properties. Additional features, properties, objects and advantages of the present teachings will be apparent from a review of the following description and the drawings.

In one aspect of the present teachings, a power tool has a prime mover (e.g., a motor or engine) at least partially disposed within an inner housing. The prime mover is adapted to drive a tool. An outer housing having a handle or grip is coupled to the inner housing.

In another aspect of the present teachings, one or more vibration insulating or dampening devices is disposed between the inner and outer housings. The outer housing preferably shields the vibration insulating or dampening device(s) from the outside environment and preferably does not directly contact either the inner housing or the prime mover.

In a preferred embodiment of the present teachings, a gardening trimmer preferably comprises a pair of shear blades, a prime mover adapted to drive the pair of shear blades, an inner housing that at least partially houses the prime mover, and an outer housing that at least partially houses the inner housing and on which a grip or handle to be grasped by a user is arranged.

The power tool preferably has a dual housing. The term 'dual housing' utilized herein refers to a configuration in which a housing space is separated into two portions, e.g., as in the aforementioned inner and outer housing. Because of this design, at least one vibration insulator may be arranged between the inner housing and outer housing. The vibration insulator may be positioned in the interior of the outer housing, and may be protected by the outer housing. Thus, deterioration of and damage to the vibration insulator is prevented or reduced. In this way, the service life of the vibration insulator is increased and the transmission of vibration to a user may be prevented for a longer period of time than in known power tools.

In addition or in the alternative, in power tools having a dual housing structure, an intake opening and an exhaust opening for admitting and exhausting, respectively, a flow of cooling air to the prime mover can be formed in the inner housing, and the intake opening and/or the exhaust opening may respectively be arranged to face a portion of an internal surface of the outer housing. In this way, the intake opening and/or the exhaust opening can be screened or shielded by the outer housing, and thus foreign objects can be prevented from entering from the intake opening and/or the exhaust opening without the necessity of having to arrange a mesh filter in or on the intake opening. Thus, the cooling capacity is not reduced by the need for such a filter, which would reduce the cross-sectional flow area of the intake opening and moreover, aspiration noises can be avoided or minimized. Furthermore, if the exhaust opening is also screened or shielded by the outer housing, exhaust air discharged from the exhaust opening can be prevented from directly flowing towards and striking the user, thereby improving the user's comfort while using the power tool.

DETAILED DESCRIPTION OF THE INVENTION

In one aspect of the present teachings, the term 'dual housing' encompasses, but is not limited to, a configuration in which at least two housing spaces (e.g., an inner and an outer space) are disposed in an overall housing of the power tool. In another aspect of the present teachings, the power tool housing is understood as being spatially separated into two housing components. The power tool preferably comprises an inner housing at least partially disposed within an outer housing. The power tool is also preferably a hand-held power tool, although the present teachings are also applicable to tools that are not intended to be held by the user during operation.

It is preferable that at least one crossbeam or strut extends from one side wall to another side wall of the outer housing. In addition, it is preferable that at least one through-hole is formed in the inner housing and the crossbeam of the outer housing passes through or is disposed in the through-hole of the inner housing. In this case, it is preferable that at least one tube-shaped or annular vibration insulator is arranged at each end of the through-hole of the inner housing. The two tube-shaped vibration insulators may have the same shape or different shapes and/or may be used in combination with one or more vibration insulators having another shape and arranged in other positions. Furthermore, the tube-shaped vibration insulator(s) may be arranged along an exterior surface of the inner housing that surrounds the end of the through-hole, and/or may be embedded in the end of the through hole.

It is understood that the crossbeam or strut may have a variety of outer cross-sectional shapes, such as oval, circular, semi-circular, polygonal (such as triangular, rectangular, hexagonal, etc.) or other more complex geometries (e.g., C-shaped, U-shaped, V-shaped, etc). The crossbeam or strut may be hollow or solid.

The vibration insulating device(s) is/are preferably hollow so as to receive the crossbeam in a close-fitting or form-fitting manner and the hollow interior of the vibration insulating device may be any appropriate shape for this purpose. At least a portion of the exterior of the vibration insulating device(s) is preferably configured to closely abut or form-fit with a portion of an interior surface of the outer housing of the power tool.

Although preferred embodiments include vibration insulating or dampening devices that completely encircle or surround part or all of the crossbeam/strut, it is also understood that the vibration insulating or dampening device(s) may only partially surround the crossbeam/strut. It is sufficient if the vibration insulating device(s) serve as a buffer between the inner housing and the outer housing, such that the inner and outer housings do not directly contact each other.

According to such a construction, even if a strong force is applied to the tool (e.g., a pair of shear blades) attached to the inner housing, the inner housing will be securely held by means of the at least one crossbeam of the outer housing. The vibration insulators will also be reliably held by the at least one crossbeam of the outer housing. Thus, the vibration insulators can be prevented from being displaced or falling off.

In a particularly preferred embodiment, tube-shaped vibration insulators, as described above, each have a narrow portion, which is positioned inside of the through-hole of the inner housing, and a wide portion, which is positioned outside of the through-hole of the inner housing and between the inner housing and the outer housing.

In this embodiment, the inner housing and outer housing can be reliably prevented from coming into direct contact with each other even if the inner housing is displaced in various directions with respect to the outer housing.

It is preferable that a plurality of crossbeams is formed in the interior of the outer housing. In this case, it is preferable that at least one of the plurality of crossbeams is positioned forward of a rotational axis of a crank member housed in the inner housing. In addition, it is preferable that at least one other crossbeam is positioned rearward of the rotational axis of the crank member.

The crank member is one of the primary sources of vibration in a power tool having a rotating motor that drives a reciprocating tool. It is preferable that the crank member is disposed at least partially within the inner housing. By disposing the crossbeams and the vibration insulators, which are arranged at the through-holes corresponding to respective crossbeams, on the front side of as well as on the rear side of the rotational axis of the crank member, the transmission of vibration to the outer housing can be more effectively prevented. If a grip or handle for holding the power tool is disposed on or attached to the outer housing, the user will feel less vibration during operation of the power tool.

It is preferable that at least one of the vibration insulators is arranged on a top portion of the inner housing.

According to this construction, the outer housing can be supported on the inner housing via the vibration insulator(s) arranged at the aforesaid top portion as well as elsewhere (e.g., the tube-shaped vibration insulators on the lateral sides). The vibration insulators can support the inner housing with good balance. Thus, even if the power tool is used, e.g., in a tilted position, the transmission of vibration to the outer housing can be effectively prevented or minimized.

It is preferable that the vibration insulators are formed of or at least comprise a viscoelastic material. More preferably, that the vibration insulators are formed of or comprise a synthetic rubber.

When the vibration insulators are formed of or at least comprise a viscoelastic material, vibration produced at or within the inner housing can be further minimized, and the transmission of the vibration to the outer housing can be more effectively suppressed, dampened and/or absorbed.

In certain embodiments of the present teachings, it is preferable to form an opening in the outer housing and to form a corresponding raised portion on the inner housing that protrudes at least partially into or through the opening of the outer housing.

If the outer housing completely surrounds the inner housing, the size of the outer housing is required to be relatively large. However, if a portion of the inner housing is allowed to protrude into or partially through an opening in the outer housing, a sufficient internal volume for housing the prime mover etc. within the inner housing can still be provided while reducing the overall size of the power tool housing. If one or more raised parts protrude through one or more openings, a larger internal volume of the inner housing can be provided without having to increase the overall size of the outer housing.

It is preferable that the intake opening and exhaust opening of the inner housing are each adjacent to an interior surface of the outer housing. More preferably, a space is provided between each of the intake and exhaust opening and the facing interior surface of the outer housing. That is, the outer housing preferably shields or screens the intake and exhaust openings of the inner housing.

According to this construction, with both the intake opening and the exhaust opening being shielded or screened by the outer housing, foreign objects can be prevented from entering through either of the intake opening and the exhaust opening. The size of the intake opening and the exhaust opening can thus be increased without concern for entrance of the foreign objects into the inner housing, which preferably contains sensitive elements, such as a motor and a crank mechanism. In addition, air discharged from the exhaust opening can also be prevented from directly striking the user, and thus the user will not feel a sense of discomfort while operating the power tool.

It is preferable that an opening is formed in the outer housing between an area that faces the intake opening of the inner housing and an area that faces the exhaust opening of the inner housing.

According to this construction, the exhaust discharged from the exhaust opening of the inner housing can be discharged from the opening of the outer housing, and thus does not pass through or circulate within the interior of the outer housing where it could be drawn in again through the intake opening of the inner housing.

In such embodiments, in which the intake and exhaust openings of the inner housing are shielded by a portion of the outer housing, it is also preferable that a raised portion of the inner housing protrudes at least partially into or through an opening of the outer housing, as was discussed above. Further, a space is preferably formed between the opening of the outer housing and the raised portion of the inner housing.

As was discussed above, if the outer housing completely surrounds the inner housing, the inner housing must be made relatively small in order to be completely housed within the outer housing. As a result, it may become difficult to install the prime mover and other components in the inner housing. In contrast, when at least one opening is formed in the outer housing and at least one raised portion of the inner housing at least partially protrudes into or through the opening(s), the internal volume of the inner housing can be made larger without increasing the overall size of the housing as a whole. In addition, by arranging the raised portion(s) of the inner housing to be spaced apart from the outer housing in the vicinity of the opening(s), the intake and the cooling air can be discharged smoothly via the space defined between the inner and outer housings.

It is preferable that a grille or lattice is arranged in and/or on at least one of the intake opening and exhaust opening of the inner housing.

Since the intake opening and/or the exhaust opening each preferably face and are shielded by a portion of the interior surface of the outer housing, those openings formed in the inner housing can be made wider or larger, as was discussed above. However, such wide openings may reduce the strength or integrity of the inner housing. Thus, when a grille or support lattice is formed in or on the intake opening and/or the exhaust opening, a sufficient strength of the housing can be maintained.

It is preferable that a plurality of vibration insulators is arranged between the outer housing and the inner housing. In this case, it is preferable that at least one vibration insulator is present in front of, in back of, to the left of, to the right of, and/or above and below the motor disposed in the inner housing.

It is preferable that a cooling fan is rotated by the motor and is housed in the inner housing. In this case, it is preferable that the cooling fan is arranged on the motor shaft of the motor. According to this construction, the cooling fan creates an airflow from the intake opening to the exhaust opening within the inner housing while the motor rotates and drives the tool, e.g., a pair of shear blades.

It is preferable to position the intake opening of the inner housing above the motor. In addition, it is preferable to position the exhaust opening of the inner housing below the motor. According to this construction, even if a foreign object enters into the inner housing, the foreign object can easily fall out of the inner housing.

It is preferable that the exhaust opening of the inner housing opens or discharges towards a side that is opposite to the direction in which the intake opening is positioned with respect to the inner housing. This construction can prevent the intake opening from drawing in air that was just exhausted from the exhaust opening.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power tools, as well as methods for using and manufacturing the same.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment 1

Figure 1:
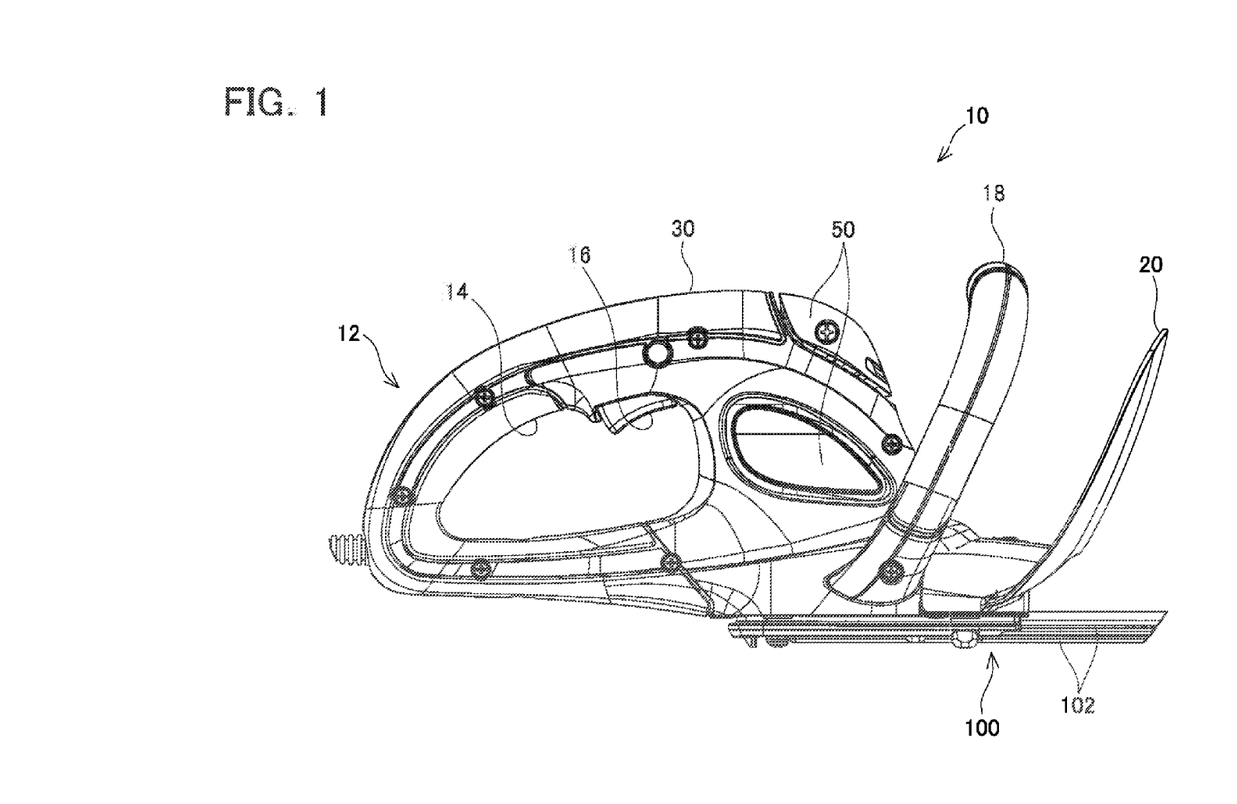
FIG. 1 shows a lateral view of a hedge trimmer of a first embodiment.
Figure 2:
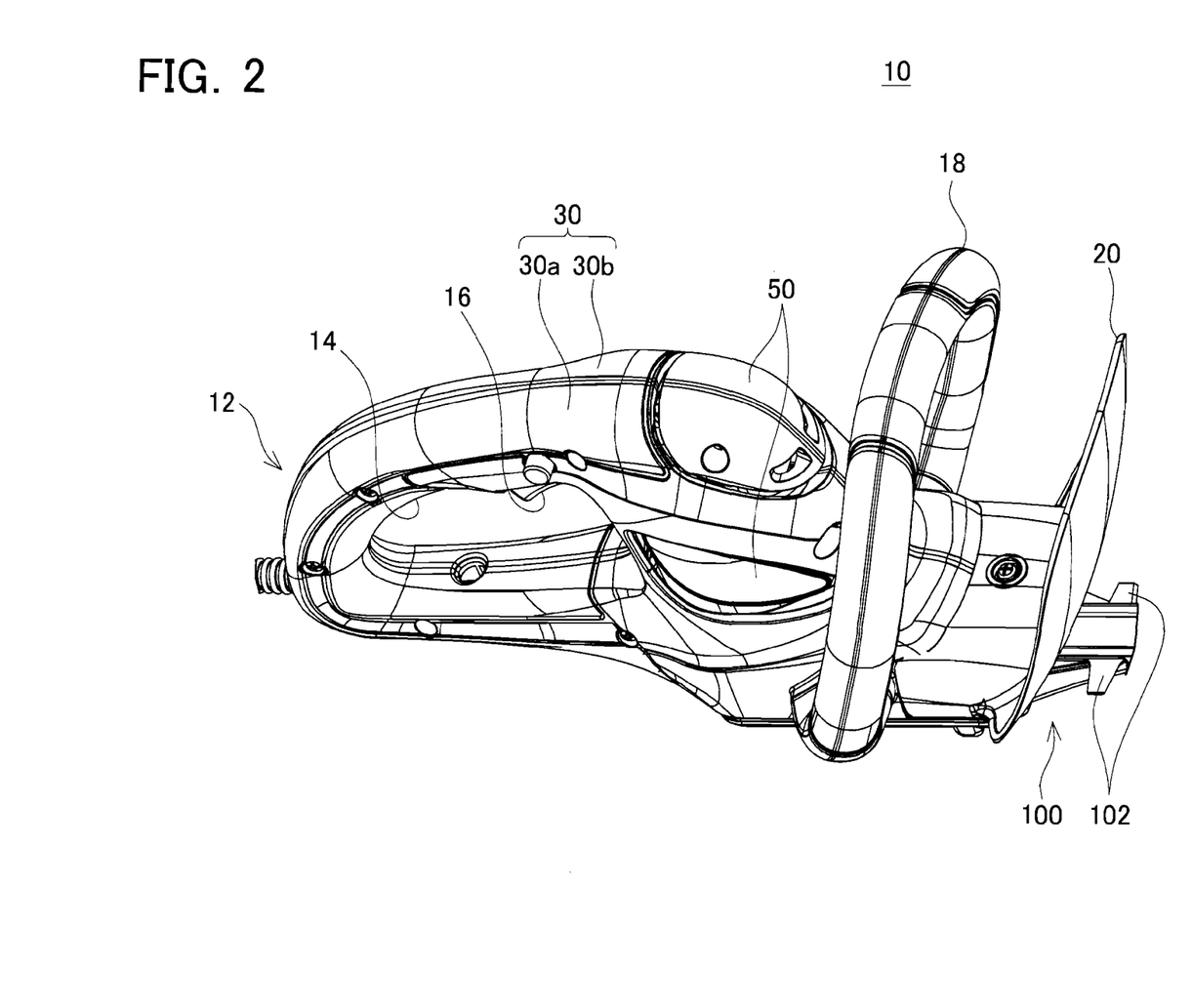
FIG. 2 shows a perspective view of the hedge trimmer of the first embodiment.

FIG. 1 and FIG. 2 show the external appearance of a hedge trimmer of a first representative, non-limiting embodiment of the present teachings. The hedge trimmer 10 is a power tool employed for pruning hedges, bushes or the like. It should be noted that the hedge trimmer 10 is merely an exemplary implementation of the present teachings; the present teachings may also be applied to a wide variety of other types of power tools, e.g., trimmers, mowers and the like. Generally speaking, the present teachings are applicable to any power tool that will be held by a user during operation and which has a motor or other mechanism that generates undesired vibration during operation. For example, the present teachings are particularly applicable to power tools having a rotating motor or engine, which drives one or more reciprocally-moving tools via a crank mechanism.

In the following description, directions such as front, rear (back), left, right, top, bottom, unless defined otherwise, are expressed with respect to the main body of the gardening trimmer when held in its usual or normal orientation during operation. For example, the "front", "rear", "top" and "bottom" directions refer to directions to the right side (towards where a blade assembly 100 is arranged), the left side (towards where a power source (not shown) is connected), the upper side and the lower side as shown in FIG. 1 respectively.

As shown in FIGS. 1 and 2, the hedge trimmer 10 comprises a main body 12, and a blade assembly 100 that is attached to the main body 12.

The blade assembly 100 is fixed to the main body 12 with screws (not shown), and is detachable from the main body 12. A pair of shear blades 102 is included in the blade assembly 100. A front portion of the shear blades is omitted from the drawings for clarity purposes, although it is understood that the pair of shear blades 102 extends forwardly. A plurality of cutting portions is formed in a comb or toothed shape on the pair of shear blades 102. The pair of shear blades 102 trims hedges by reciprocally moving relative to each other along a linear path. The structure of the shear blades 102 may be the same as commonly known shear blades, and thus a detailed explanation thereof will be omitted.

The main body 12 comprises an outer housing 30. The outer housing 30 preferably comprises a plastic material, although part or all of the housing may be comprised, e.g., of metal, ceramic, wood or another material. The outer housing 30 is primarily comprised of a right wall half 30a and a left wall half 30b (see FIG. 2). A main grip 14 and a front grip 18 for a user to grip are arranged on the outer housing 30. A trigger switch 16 is arranged on the main grip 14. The trigger switch 16 is the starting switch for a motor of the hedge trimmer 10. The user may grasp the main grip 14 and the front grip 18, and perform the task of trimming with the hedge trimmer 10 by operating the trigger switch 16 with the user's index finger. A chip guard 20 is arranged on the front portion of the outer housing 30. The chip guard 20 prevents pieces of cut branches and leaves from being ejected towards the user.

Figure 3:
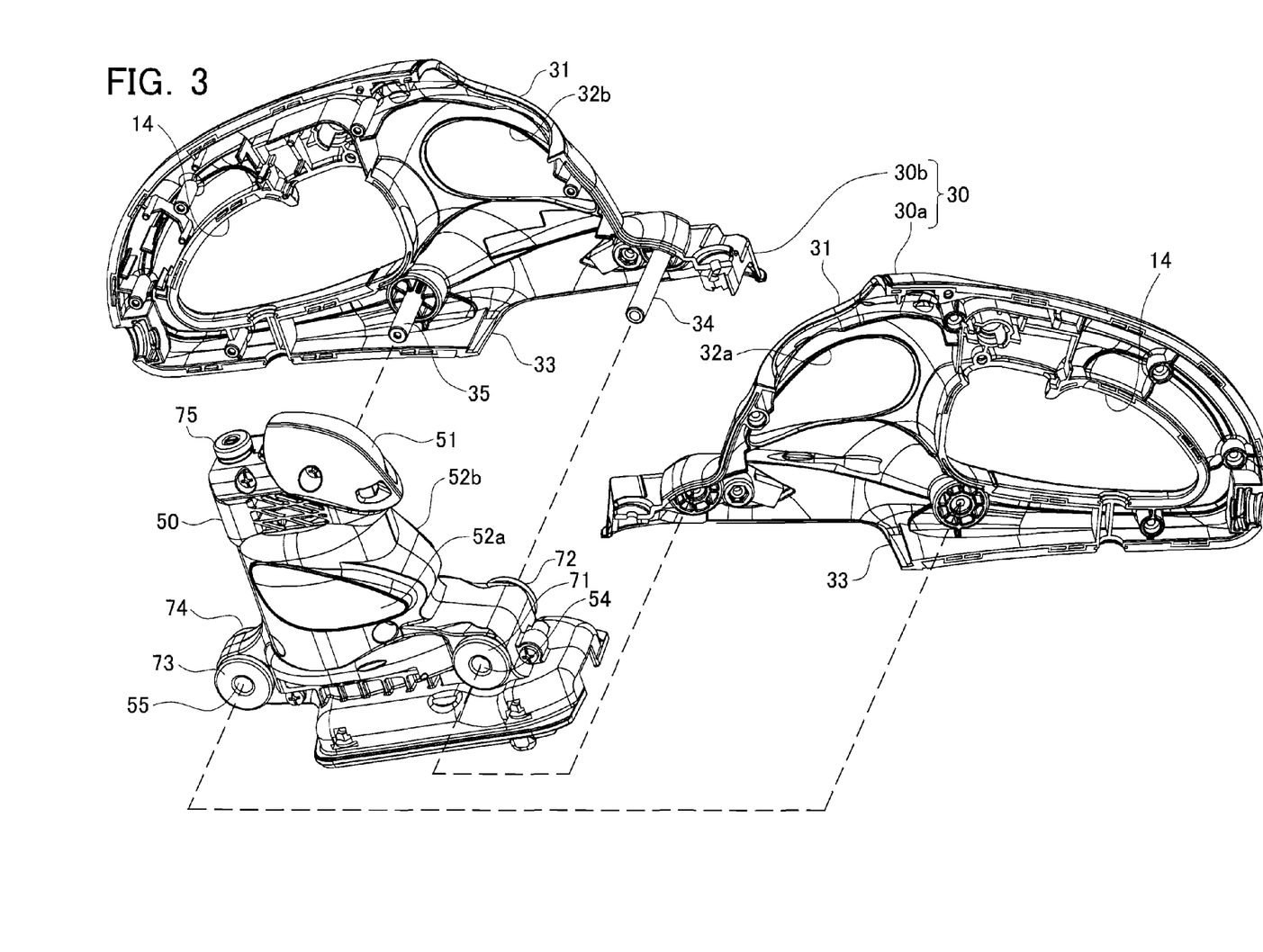
FIG. 3 shows a disassembled view of an inner housing and an outer housing.
Figure 4:
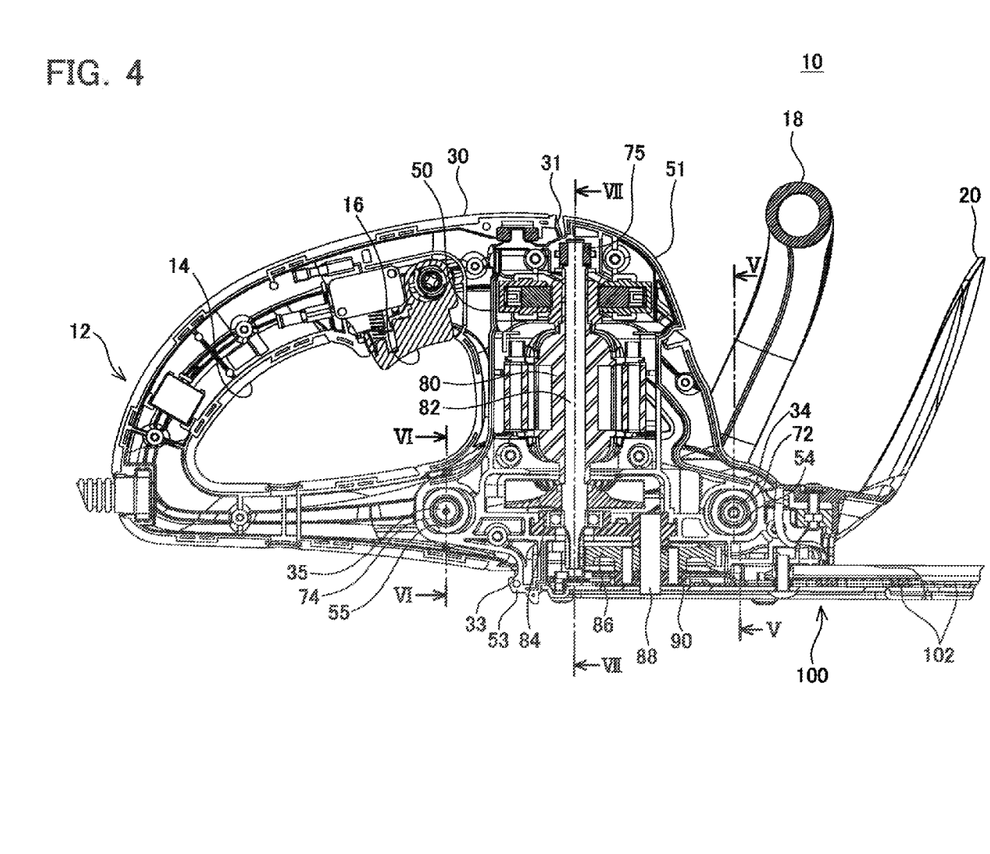
FIG. 4 shows a longitudinal cross-sectional view of the hedge trimmer.

FIG. 3 shows the right wall half 30a and the left wall half 30b of the outer housing 30 in a disassembled state (exploded view). FIG. 4 shows a longitudinal cross-sectional view of the hedge trimmer 10. As shown in FIGS. 3 and 4, an inner housing 50 is housed in the interior of the outer housing 30. Thus, the main body 12 has a dual structure housing 30, 50. As shown in FIG. 4, the blade assembly 100 described above is attached to the lowermost portion 53 of the inner housing 50. The lowermost portion 53 of the inner housing 50 downwardly and outwardly extends from a bottom opening 33 formed in the bottom portion of the outer housing 30. That is, the lowermost portion 53 of the inner housing 50 is exposed by, and in this embodiment also protrudes outwardly from, the bottom opening 33 of the outer housing 30.

As shown in FIG. 4, housed within the inner housing 50 are: a motor 80 for driving the pair of shear blades 102, a reduction gear 86 that is engaged with a motor shaft 82 of the motor 80, a crank cam 90 that is coaxially fixed with the reduction gear 86, and a cam shaft 88 that rotatably supports the reduction gear 86 and the crank cam 90. The crank cam 90 is engaged with the pair of shear blades 102, and converts the rotational motion of the motor 80 into linear reciprocal motion of the pair of shear blades 102. When the trigger switch 16 noted above is operated, electric power is supplied to the motor 80, and the motor 80 begins to rotate. When the motor 80 rotates, the crank cam 90 rotates, and the two shear blades 102 thereby reciprocally move along respective linear paths.

A cooling fan 84 for cooling the motor 80 is arranged on the motor shaft 82. When the motor 80 rotates, the cooling fan 84 also rotates and cools the motor 80. The cooling structure of the hedge trimmer 10 will be explained in detail below.

As shown in FIGS. 3 and 4, a front crossbeam 34 and a rear crossbeam 35 project from the left wall half 30b of the outer housing 30. Correspondingly, a front through-hole 54 and a rear through-hole 55 are defined in the inner housing 50. The front crossbeam 34 is inserted into the front through-hole 54. The rear crossbeam 35 is inserted into the rear through-hole 55. According to this structure, the inner housing 50 is reliably held by the outer housing 30, and is prevented from falling out through the bottom opening 33 of the outer housing 30. More particularly, the front crossbeam 34 and the front through-hole 54 are disposed forward of the motor 80 and the crank cam 90. In addition, the rear crossbeam 35 and the rear through-hole 55 are disposed rearward of the motor 80 and the crank cam 90. In this way, the inner housing 50 is stably supported.

Figure 5:
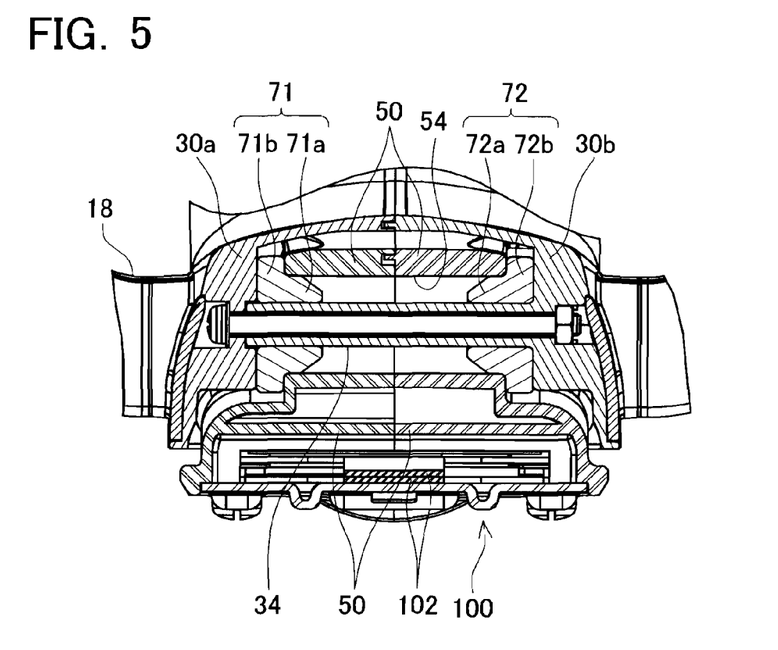
FIG. 5 shows a cross-sectional view taken along line V-V of FIG. 4.

FIG. 5 is a cross-section taken along line V-V of FIG. 4. As shown in FIG. 4 and FIG. 5, the front crossbeam 34 of the outer housing 30 passes through the front through-hole 54 of the inner housing 50, and extends from the left wall half 30b to the right wall half 30a. Tube-shaped front vibration insulation sleeves 71, 72 are arranged on both end portions of the front through hole 54. It will be understood that sleeves 71, 72 may, in addition or in the alternative, be adapted or constructed to perform a vibration dampening function, a vibration absorbing function and/or a vibration shielding (barrier) function.

The front vibration insulation sleeves 71, 72 are also illustrated in FIG. 3 and are preferably made of or are at least partially comprised of silicone rubber. Narrow portions 71a, 72a and wide portions 71b and 71b are formed on the front vibration insulation sleeves 71, 72. The narrow portions 71a, 72a are positioned in the interior of the front through-hole 54. The narrow portions 71a, 72a are disposed between the front through-hole 54 and the front crossbeam 34, and are in contact with both the front through-hole 54 and the front crossbeam 34. The wide portions 71b, 72b are positioned on the exterior of the front through-hole 54. The wide portions 71b, 72b are disposed between the inner housing 50 and the outer housing 30, and are in contact with both the inner housing 50 and the outer housing 30. The inner housing 50 is held in an interposed or suspended state relative to the outer housing 50 by the wide portions 71b, 72b of the two front vibration insulation sleeves 71, 72.

The front vibration insulation sleeves 71, 72 prohibit the outer housing 30 and the inner housing 50 from directly contacting each other. In addition, the front vibration insulating sleeves 71, 72 are reliably and immovably held in place due to their aforementioned stepped shape having different outer diameters. Furthermore, because the front crossbeam 34 passes through the front vibration insulation sleeves 71, 72, this arrangement also prevents the front vibration insulation sleeves 71, 72 from falling out.

Figure 6:
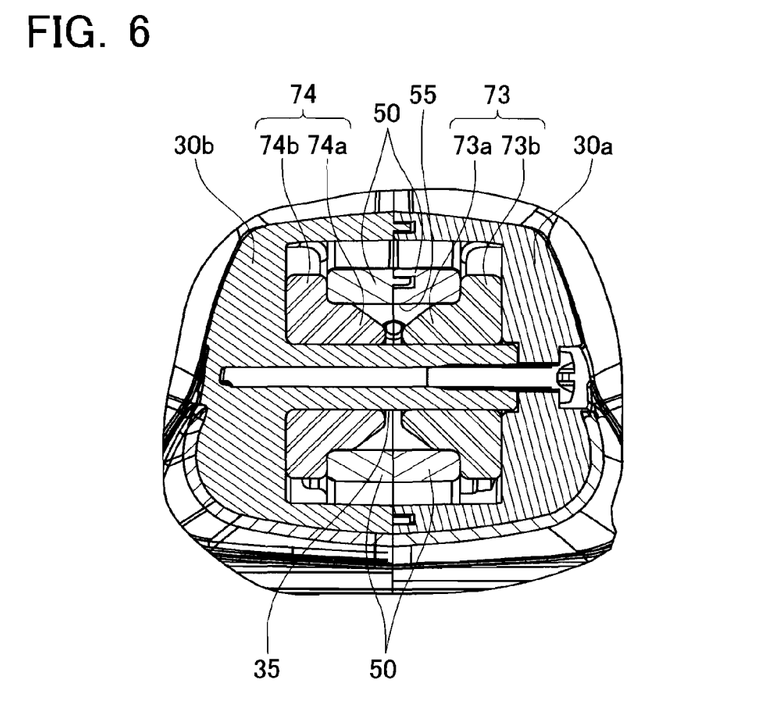
FIG. 6 shows a cross-sectional view taken along line VI-VI of FIG. 4.

FIG. 6 is a cross-section taken along line VI-VI of FIG. 4. As shown in FIG. 4 and FIG. 6, the rear crossbeam 35 of the outer housing 30 passes through the rear through-hole 55 of the inner housing 50, and extends from the left wall half 30b to the right wall half 30a. Tube-shaped rear vibration insulation sleeves 73, 74 are arranged on both end portions of the rear through-hole 55. Here, the rear vibration insulation sleeves 73, 74 are also illustrated in FIG. 3. The rear vibration insulation sleeves 73, 74 are preferably the same components as the front vibration insulation sleeves 71, 72 noted above, although it is understood that the rear vibration insulation sleeves 73, 74 may have different shapes and/or may be composed of different materials than the front vibration sleeves 71, 72.

The narrow portions 73a, 74a of the rear vibration insulation sleeves 73, 74 are positioned in the interior of the rear through-hole 55, and lie between the rear through-hole 55 and the rear crossbeam 35 so as to be in contact with both. The wide portions 73b, 74b of the rear vibration insulation sleeves 73, 74 are positioned on the exterior of the rear through-hole 55, and lie between the inner housing 50 and the outer housing 30 so as to be in contact with both. The inner housing 50 is held in an interposed or suspended state relative to the outer housing by the wide portions 73b, 74b of the two rear vibration insulation sleeves 73, 74.

The rear vibration insulation sleeves 73, 74 prohibit the outer housing 30 and the inner housing 50 from directly contacting each other. In addition, the rear vibration insulating sleeves 73, 74 are reliably and immovably held in place due to their aforementioned stepped shape having different outer diameters. Furthermore, because the rear crossbeam 35 passes through the rear vibration insulation sleeves 73, 74, this arrangement will also prevent the rear vibration insulation sleeves 73, 74 from falling out.

It should be noted that the vibration insulation members 71, 72, 73, 74 are not limited to having a tubular shape. For instance, the vibration insulator(s) may have any shape as long as the crossbeam(s) of the outer housing and the through-hole(s) of the inner housing are separated or spaced from each other by at least a portion of at least one vibration insulator.

As shown in FIGS. 3 and 4, a top vibration insulation ring 75 is arranged on the top portion of the inner housing 50. The vibration insulation ring 75 is preferably made of silicone rubber. The outer peripheral surface of the vibration insulation ring 75 is held by or interference fit in the outer housing 30. The top vibration insulation ring 75 also prohibits the outer housing 30 and the inner housing 50 from directly contacting each other. The vibration insulation ring 75 is positioned above the motor 80, whereas the front vibration insulation sleeves 71, 72 and the rear vibration insulation sleeves 73, 74 noted above are positioned below the motor 80.

In the hedge trimmer 10 of the present embodiment, the motor 80 and the crank arm 90 are disposed in the inner housing 50 and the blade assembly 100 is partially disposed in the inner housing 50. The motor 80, the crank arm 90, and the blade assembly 100 generate vibration when the hedge trimmer 10 is operated, thereby causing the inner housing 50 to vibrate. If the vibration of the inner housing 50 were to be transmitted to the outer housing 30, the vibration would also be transmitted to the user who is holding the main grip 14 and the front grip 18 of the outer housing 30.

In order to minimize vibration from being transmitted to the user, in the hedge trimmer 10 of the present embodiment, the viscoelastic vibration insulation sleeves 71, 72, 73, 74 and vibration insulation ring 75 (hereinafter, collectively referred to as "vibration insulators 71-75") are arranged between the outer housing 30 and the inner housing 50. In addition, the outer housing 30 retains the inner housing 50 via the vibration insulators 71-75 and the crossbeams 34, 35. The vibration insulators 71-75 prevent the outer housing 30 and the inner housing 50 from making direct contact with each other. Thus, even if vibration is generated in the inner housing 50, such vibration is prevented or is substantially prevented from being transmitted to the outer housing 30. Thus, the vibration transmitted to the user can be substantially reduced.

The vibration insulators 71-75 are disposed in the interior of the outer housing 30. Thus, the vibration insulators 71-75 do not come into contact with external objects, and also are not exposed to external conditions such as a direct sunlight. As a result, deterioration of and damage to the vibration insulators 71-75 typically caused by external exposure in known power tools can be prevented or minimized in embodiments of the present teachings. The vibration insulation function/property of the vibration insulators 71-75 can thus be maintained for a longer period of time.

The vibration insulators 71-75 are preferably formed from silicone rubber. Silicone rubber is a viscoelastic material. In other words, the vibration insulators 71-75 are not only elastic, but are also viscous. Thus, the vibration insulators 71-75 can quickly attenuate vibration generated inside the inner housing 50. By utilizing viscoelastic materials, the amount of vibration transmitted to the user can be reduced even further.

Here, the vibration insulators 71-75 can also be made or comprised of other viscoelastic materials. Examples of other suitable viscoelastic materials include various synthetic rubbers, such as EPDM (Etylene Propylene Diene Monomer Rubber), NBR (Nitrile Butadiene Rubber), SBR (Styrene Butadiene Rubber), BR (Butadiene Rubber), and IR (Isoprene Rubber).

Although viscoelastic materials are preferred, other types of materials capable of absorbing, dampening, shielding or otherwise preventing the transmission of vibrations may also be utilized with the present teachings.

As shown in FIG. 3, an upper opening 31 and two side openings 32a, 32b are formed in the outer housing 30. Correspondingly, an upper raised portion 51 and two side raised portions 52a, 52b are formed on the inner housing 50. The upper raised portion 51 of the inner housing 50 protrudes through the upper opening 31 of the outer housing 30 and is exposed to the exterior; the two side raised portions 52a, 52b of the inner housing 50 also extend into the two side openings 32a, 32b of the outer housing 30, respectively, and are exposed to the exterior. The upper raised portion 51 projects out of the upper opening 31, whereas the two side raised portions 52a, 52b each do not extend externally from or project beyond the two side openings 32a, 32b. In both cases, a space or air cushion is formed between the respective openings 31, 32a, 32b of the outer housing 30 and each of the raised portions 51, 52a, 52b of the inner housing 50. Thus, even if the inner housing 50 vibrates, the raised portions 51, 52a, 52b of the inner housing 50 will not come into contact with the openings 31, 32a, 32b of the outer housing 30. It should be noted that the raised portions 52a, 52b may also be designed to project out of the respective openings 32a, 32b in case a larger internal volume is required for the inner housing 50.

As noted above, since the inner housing 50 comprises the raised portions 51, 52a, 52b that protrude into or through the openings 31, 32a, 32b of the outer housing 30, the internal volume of the inner housing 50 can be increased while making the sizes of the housings 30, 50 comparatively small. In contrast, if the inner housing 50 were to be designed, e.g., to be completely housed within the outer housing 50, the outer housing 50 must be made larger, even though the internal volume of the inner housing 50 is the same as the present embodiment. Thus, this aspect of the present teachings can be utilized to minimize the overall outer dimensions of the power tool.

Figure 7:
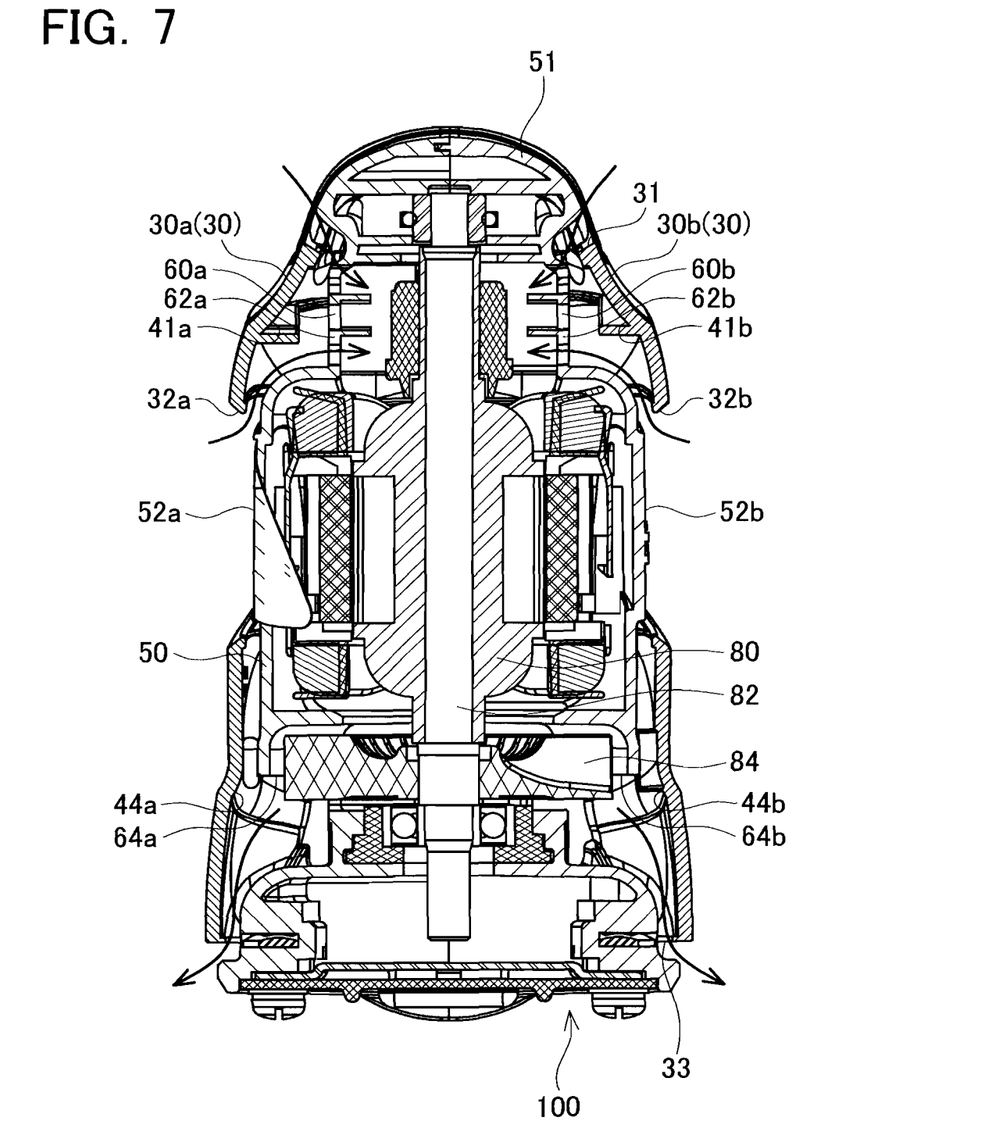
FIG. 7 shows a cross-sectional view taken along line VII-VII of FIG. 4.
Figure 8:
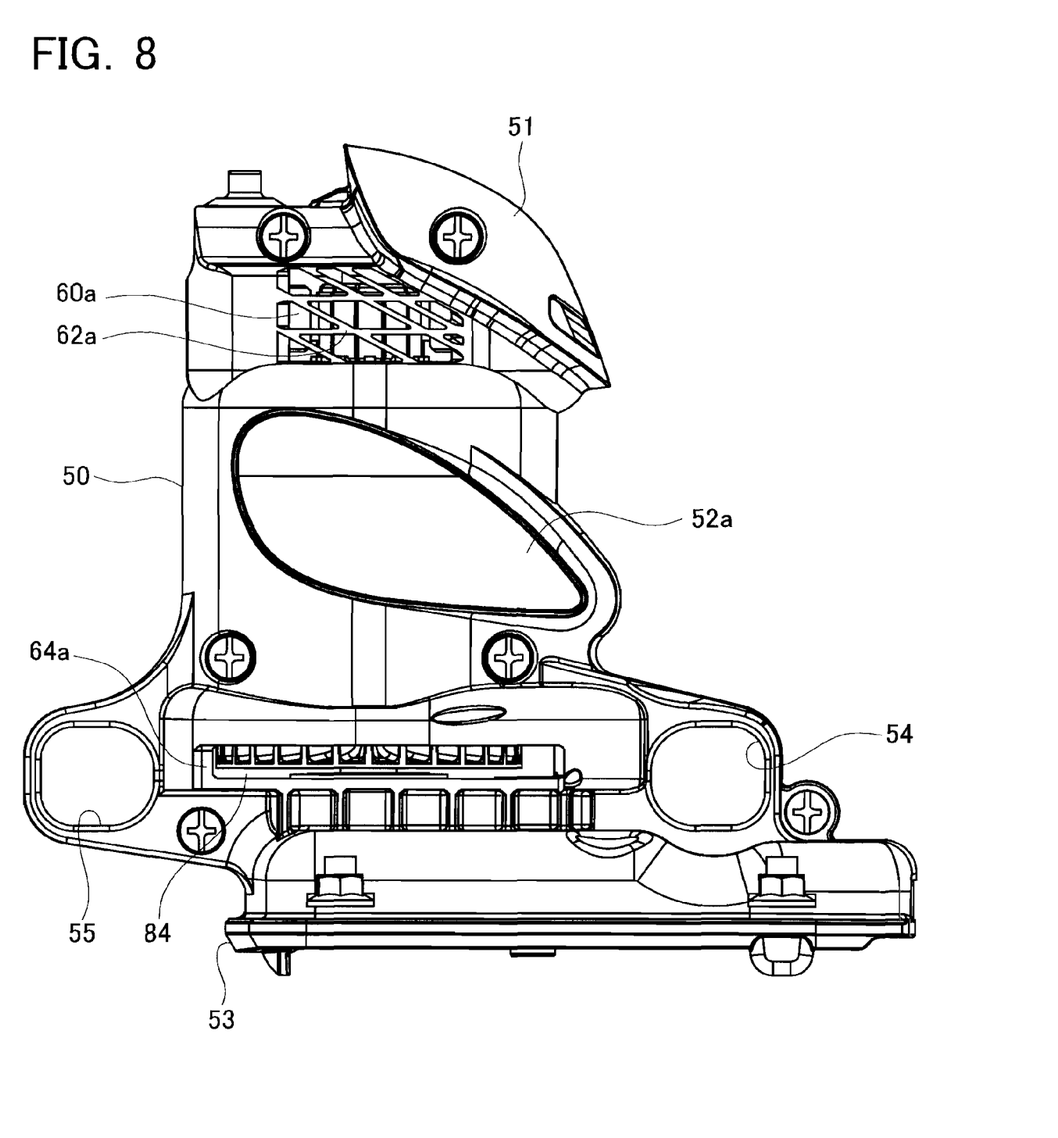
FIG. 8 shows a lateral view of the inner housing.
Figure 9:
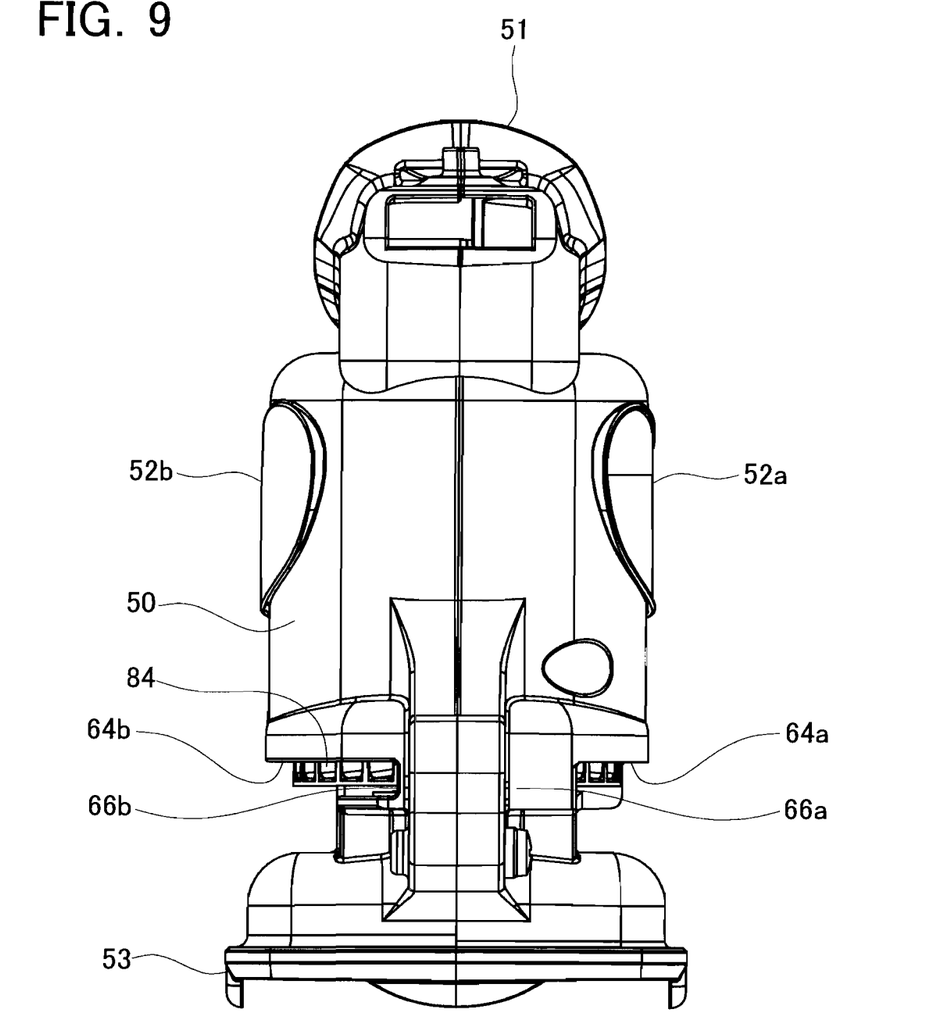
FIG. 9 shows a rear view of the inner housing.

Next, a preferred cooling structure for the hedge trimmer 10 will be explained with reference to FIGS. 7, 8, and 9. FIG. 7 is a cross-section taken along line VII-VII of FIG. 4. FIGS. 8 and 9 show the external appearance of the inner housing 50. As shown in FIGS. 7, 8, and 9, two intake openings 60a, 60b, and two exhaust openings 64a, 64b, are formed in the inner housing 50. The intake openings 60a, 60b are formed above the motor 80. The exhaust openings 64a, 64b are formed below the motor 80. Grilles or support lattices 62a, 62b are formed in the intake openings 60a, 60b.

As was explained above, the cooling fan 84 is arranged on the motor shaft 82 of the motor 80. The cooling fan 84 generates a downward flow of air inside the inner housing 50 when rotated by the motor 80. As a result, air from the outside flows through the openings 31, 32a, 32b of the outer housing 30 and the intake openings 60a, 60b, and enters the inner housing 50. Subsequently, the air inside the inner housing 50 flows through the exhaust openings 64a, 64b and the bottom portion opening 33 of the outer housing 30, and is discharged to the outside. Thus, by drawing cooler air from the outside into the inner housing 50, the motor 80 can be prevented from overheating.

As shown in FIG. 7, the intake openings 60a, 60b of the inner housing 50 face surface areas 41a, 41b of the outer housing 30. That is, the intake openings 60a, 60b of the inner housing 50 are screened or shielded by the respective surface areas 41a, 41b of the outer housing 30. In this configuration, foreign objects such as pebbles can be prevented from entering the inner housing 50 from the intake openings 60a, 60b. Likewise, the exhaust openings 64a, 64b of the inner housing 50 face surface areas 44a, 44b of the outer housing 30. That is, the exhaust openings 64a, 64b of the inner housing 50 are screened or shielded by the respective surface areas 44a, 44b of the outer housing 30. In this configuration, air discharged from the exhaust openings 64a, 64b will be prevented from striking the user, and thus the user will not feel a sense of discomfort during operation. In addition, even if foreign objects have entered the inner housing 50, such foreign objects will be prevented from being ejected at high speed from the exhaust openings 64a, 64b.

As noted above, the intake openings 60a, 60b and the exhaust openings 64a, 64b of the inner housing 50 are screened by the outer housing 30. Thus, even if the size of the intake openings 60a, 60b and the exhaust openings 64a, 64b is made relatively wide, foreign objects can still be prevented from entering the inner housing 50. However, if the size of the intake openings 60a, 60b and the exhaust openings 64a, 64b becomes too wide, the strength or integrity of the inner housing 50 may be reduced. Accordingly, with the hedge trimmer 10 of the present embodiment, grilles 62a, 62b are arranged on or in the intake openings 60a, 60b in order to ensure that the inner housing 50 has sufficient strength and integrity. In addition or in the alternative, the same grilles may be formed on or in the exhaust openings 64a, 64b. In this configuration, the strength of the inner housing 50 can be improved even more.

As shown in FIG. 7, the opening 32a is formed in the right wall half 30a of the outer housing between the surface area 41a that screens the intake opening 60a and the surface area 44a that screens the exhaust opening 64a. Likewise, the opening 32b is formed in the left wall part 30b of the outer housing between the surface area 41b that screens the intake opening 60b and the surface area 44b that screens the exhaust opening 64b. Thus, when the openings 32a, 32b are disposed between the intake openings 60a, 60b and the exhaust openings 64a, 64b, it is possible to prevent, or substantially prevent, heated air discharged through the exhaust openings 64a, 64b from circulating around the interior of the outer housing 30 and then being drawn in again through the intake openings 60a, 60b.

As shown in FIG. 7, the raised portions 51, 52a, 52b protruding into or through the respective openings 31, 32a, 32b of the outer housing 30 are formed in the inner housing 50. By designing the inner housing 50 with these raised portions 51, 52a, 52b, the internal volume of the inner housing 50 can be increased, and sufficient space for housing the motor 80, etc. can be ensured. In addition, by providing the raised portions 51, 52a, 52b, the space between the openings 31, 32a, 32b of the outer housing 30 can be made relatively narrow.

As shown in FIGS. 7 and 9, the exhaust openings 64a, 64b of the inner housing 50 are positioned at a lower side of the housing 12. In other words, the exhaust openings 64a, 64b open so as to face the side opposite to the upper side of the housing where the intake openings 60a, 60b are positioned. Furthermore, the exhaust openings 64a, 64b open downward and also face the opposite side from where the intake openings 60a, 60b are arranged (i.e. the upper side). In this configuration, air discharged from the discharge openings 64a, 64b will be prevented from being drawn in again through the intake openings 60a, 60b.

The exhaust opening 64a arranged in the right wall of the inner housing 50 and the exhaust opening 64b arranged in the left wall of the inner housing 50 are arranged in asymmetric positions with respect to the right and left side of the inner housing 50 as viewed with respect to the rotational direction of the cooling fan 84. More specifically, the exhaust opening 64a on the right wall is shifted more forward, whereas the exhaust opening 64a on the left wall is shifted more rearward. Thus, as shown in FIG. 9, the rear end portion 66b of the exhaust opening 64b on the left wall is correspondingly positioned more rearwardly than the rear end portion 66a of the exhaust opening 64a on the right wall. Thus, the positions of the two exhaust openings 64a, 64b are asymmetric with respect to the rotational direction of the cooling fan 84. In this configuration, the exhaust capability can be improved and the cooling capacity can be enhanced.

Embodiment 2

Figure 10:
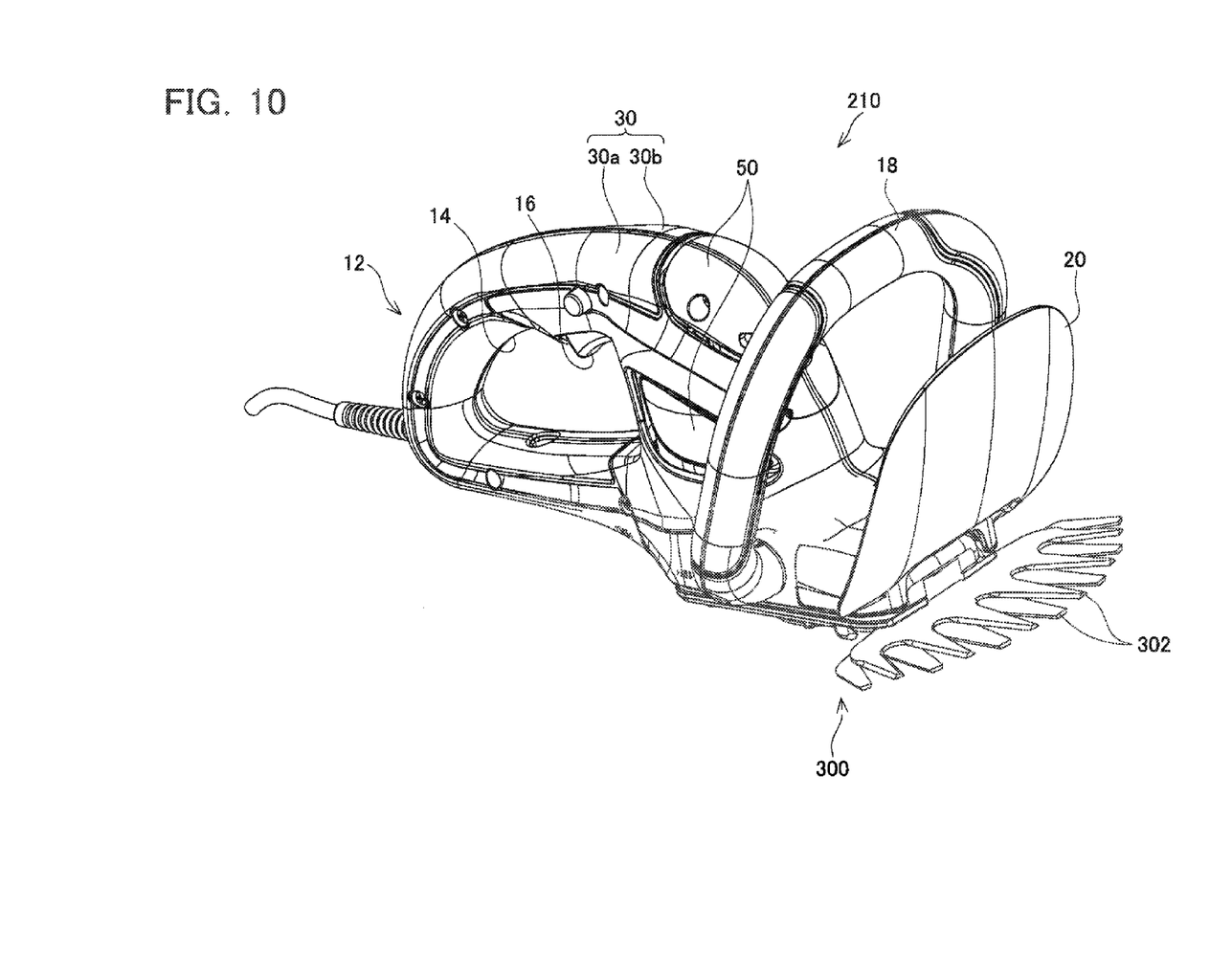
FIG. 10 shows a perspective view of a grass trimmer of a second embodiment.

FIG. 10 shows another representative grass trimmer 210 according to the present teachings. The grass trimmer 210, like the hedge trimmer 10 of the first embodiment, is a type of gardening trimmer, and is also a power tool that is utilized for trimming grass and other relatively easily-cut plant material.

The grass trimmer 210 comprises a main body 12, and a blade assembly 300 that is attached to the main body 12. The main body 12 of the grass trimmer 210 is same as the main body 12 of the hedge trimmer 10 of the first embodiment. As was explained in the first embodiment, the main body 12 of the grass trimmer 210 has a dual housing structure comprising an outer housing 30 and an inner housing 50 with vibration insulators disposed therebetween. The blade assembly 300 used for grass trimming comprises a pair of pivotably-supported shear blades 302, wherein the pair of shear blades 302 is pivoted relative to each other by means of a motor 80 (not illustrated in FIG. 10) installed in the main body 12. In other respects, the features, elements and arrangements of the first embodiment may be advantageously utilized in this second embodiment.

With such a grass trimmer 210, the transmission of vibration to a user can be prevented for a longer period of time, similar to the first embodiment. In addition, foreign objects sucked into the cooling apparatus of the main body 12 can also be prevented from being ejected at high speed by combining the above-described teachings concerning the arrangement of the intake and exhaust openings with this embodiment.

Alternatively, according to the present teachings, the hedge trimmer 10 of the first embodiment and the grass trimmer 210 of the second embodiment can be embodied in one gardening trimmer having the main body 12 as described above and two or more replaceable or exchangeable sets of blade assemblies designed for different types of gardening work. For example, by exchanging the blade assembly 100 used for hedge pruning with the blade assembly 300 used for grass trimming, the same main body 12 of the gardening trimmer can be used for multiple gardening purposes.

Specific embodiments of the present teachings are described above, but those merely illustrate some representative possibilities for utilizing the teachings and do not restrict the claims thereof. The subject matter set forth in the claims includes variations and modifications of the specific examples set forth above.

The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

What is claimed is:

1. A gardening trimmer configured to have a pair of shear blades detachably coupled thereto, comprising:
   a prime mover configured to drive the pair of shear blades;
   an inner housing that houses the prime mover;
   an outer housing that at least partially houses the inner housing and comprises at least one grip configured to be grasped by a user;
   at least four vibration insulators disposed between the inner housing and the outer housing, wherein the outer housing supports the inner housing via the at least four vibration insulators;
   a crank member coupled to the prime mover and configured to drive the pair of shear blades, the crank member being disposed at least partially within the inner housing and being configured to convert rotation of the prime mover into reciprocating movement for the pair of shear blades; and
   a switch operably connected to the prime mover and configured to be operated by the user for energizing the prime mover, the switch being disposed on the outer housing,
   wherein the outer housing comprises a first crossbeam that extends from a first side wall of the outer housing to a second side wall of the outer housing and a second crossbeam that extends from the first side wall of the outer housing to the second side wall of the outer housing,
   the first crossbeam is disposed forward of a rotational axis of the crank member and the second crossbeam is disposed rearward of the rotational axis of the crank member,
   the inner housing comprises a first through-hole and a second through-hole, the first crossbeam of the outer housing passing through the first through-hole and the second crossbeam of the outer housing passing through the second through-hole,
   two of the at least four vibration insulators are respectively disposed at each respective end of the first through-hole and between the first crossbeam and the inner housing in a direction perpendicular to a center line of the first crossbeam,
   another two of the at least four vibration insulators are respectively disposed at each respective end of the second through-hole and between the second crossbeam and the inner housing in a direction perpendicular to a center line of the second crossbeam,
   wherein the inner housing does not directly contact the outer housing, the first crossbeam or the second crossbeam, and
   wherein the outer housing comprises at least one opening, the inner housing being exposed to the outside through the at least one opening, and
   the inner housing comprises at least one raised portion that protrudes at least into a respective one of the at least one opening of the outer housing.

2. A gardening trimmer as in claim 1, wherein each of the at least four vibration insulators is annular-shaped and comprises a narrow portion that is positioned inside of the respective through-hole of the inner housing and a wide portion that is positioned outside of the respective through-hole of the inner housing and between the inner housing and the outer housing.

3. A gardening trimmer as in claim 1, wherein a first end of each of the first crossbeam and the second crossbeam is directly attached to the first side wall of the outer housing and a second end of each of the first crossbeam and the second crossbeam is directly attached to the second side wall of the outer housing.

4. A gardening trimmer as in claim 1, wherein the at least four vibration insulators comprises an additional vibration insulator disposed at a top portion of the inner housing.

5. A gardening trimmer as in claim 1, wherein the at least four vibration insulators each comprise a viscoelastic material.

6. A gardening trimmer as in claim 1, wherein the at least one raised portion of the inner housing protrudes through the respective one of the at least one opening of the outer housing.

7. A gardening trimmer as in claim 1, wherein:
   the inner housing comprises an air intake opening and an air exhaust opening, and
   at least one of the air intake opening and the air exhaust opening faces a portion of an interior surface the outer housing.

8. A gardening trimmer as in claim 7, wherein the intake opening and the exhaust opening of the inner housing each respectively face a portion of the interior surface of the outer housing.

9. A gardening trimmer as in claim 8, wherein at least one additional opening is formed in the outer housing between the portion of the interior surface of the outer housing that faces the intake opening of the inner housing and the portion of the interior surface of the outer housing that faces the exhaust opening of the inner housing.

10. A gardening trimmer as in claim 9, wherein a space is formed between the at least one opening of the outer housing and the least one raised portion of the inner housing.

11. A gardening trimmer as in claim 10, wherein the at least one raised portion of the inner housing protrudes through the at least one opening of the outer housing.

12. A gardening trimmer as in claim 11, wherein the at least four vibration insulators comprises an additional vibration insulator disposed at a top portion of the inner housing.

13. A gardening trimmer as in claim 7, wherein a lattice support is disposed in or on at least one of the intake opening and the exhaust opening of the inner housing.

* * * * *